(12) United States Patent
Haynes et al.

(10) Patent No.: US 12,365,028 B2
(45) Date of Patent: Jul. 22, 2025

(54) SYSTEMS AND METHODS FOR MANUFACTURING LANDING GEAR COMPONENTS USING TITANIUM

(71) Applicant: GOODRICH CORPORATION, Charlotte, NC (US)

(72) Inventors: Noel C. Haynes, Etobicoke (CA); Roque Panza-Giosa, Oakville (CA); Sergey Mironets, Charlotte, NC (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/687,105

(22) Filed: Mar. 4, 2022

(65) Prior Publication Data
US 2023/0278099 A1  Sep. 7, 2023

(51) Int. Cl.
*B22F 5/10* (2006.01)
*B22F 3/115* (2006.01)
(Continued)

(52) U.S. Cl.
CPC ............. *B22F 5/106* (2013.01); *B22F 3/115* (2013.01); *B22F 3/162* (2013.01); *B22F 3/24* (2013.01); *B22F 7/06* (2013.01); *B22F 10/00* (2021.01); *B33Y 10/00* (2014.12); *B33Y 80/00* (2014.12); *B64C 25/001* (2013.01); *C22C 14/00* (2013.01); *B22F 2003/248* (2013.01)

(58) Field of Classification Search
CPC .................................................. B23K 20/128
See application file for complete search history.

(56) References Cited

U.S. PATENT DOCUMENTS 3,826,301 A   7/1974  Brooks
4,973,522 A * 11/1990  Jordan ................ C22C 1/1042
                                                          428/614
(Continued)

FOREIGN PATENT DOCUMENTS

CN    101462225 A  *  6/2009
CN    102002615 A  *  4/2011
(Continued)

OTHER PUBLICATIONS

Joshi et al. Development of Ti-6Al-4V and Ti-1Al-8V-5Fe Alloys Using Low-Cost TiH2 Powder Feedstock. Journal of Materials Engineering and Performance vol. 22(4) Apr. 2013. 995-1003. (Year: 2013).*

(Continued)

*Primary Examiner* — Paul A Wartalowicz
*Assistant Examiner* — Stephani Hill
(74) *Attorney, Agent, or Firm* — SNELL & WILMER L.L.P.

(57) ABSTRACT

A metallic part is disclosed. The part may comprise a functionally graded monolithic structure characterized by a variation between a first material composition of a tubular preform and a second material composition of at least one of a secondary structural element wherein each of the first material composition and the second material composition comprises at least one of a titanium metal or an alloy of titanium. The first material composition may comprise an alpha-beta titanium alloy. The second material composition may comprise a beta titanium alloy.

13 Claims, 5 Drawing Sheets

(51) Int. Cl.
<table>
<tr><td>B22F 3/16</td><td>(2006.01)</td></tr>
<tr><td>B22F 3/24</td><td>(2006.01)</td></tr>
<tr><td>B22F 7/06</td><td>(2006.01)</td></tr>
<tr><td>B22F 10/00</td><td>(2021.01)</td></tr>
<tr><td>B33Y 10/00</td><td>(2015.01)</td></tr>
<tr><td>B33Y 80/00</td><td>(2015.01)</td></tr>
<tr><td>B64C 25/00</td><td>(2006.01)</td></tr>
<tr><td>C22C 14/00</td><td>(2006.01)</td></tr>
</table>

(56) References Cited

U.S. PATENT DOCUMENTS

| | | | |
|---|---|---|---|
| 5,160,554 A * | 11/1992 | Bania | C22C 14/00 |
| | | | 420/420 |
| 8,048,240 B2 | 11/2011 | Hebda et al. | |
| 2007/0086909 A1* | 4/2007 | Abenthung | B22F 3/20 |
| | | | 419/29 |
| 2012/0273152 A1* | 11/2012 | Heinrich | B22D 23/003 |
| | | | 164/46 |
| 2014/0377119 A1 | 12/2014 | Abkowitz | |
| 2018/0031028 A1* | 2/2018 | Himmelmann | B64C 25/20 |
| 2019/0381603 A1* | 12/2019 | Lan | B23K 15/0026 |
| 2020/0238379 A1 | 7/2020 | Hayes et al. | |
| 2021/0205916 A1* | 7/2021 | Senderos | B22F 10/00 |

FOREIGN PATENT DOCUMENTS

| | | | |
|---|---|---|---|
| CN | 103447760 A | * | 12/2013 |
| CN | 105397276 A | * | 3/2016 |
| CN | 113798341 A | * | 12/2021 |
| EP | 3610972 | | 2/2020 |
| EP | 3685957 | | 7/2020 |
| GB | 2489244 | | 9/2012 |
| JP | 01205060 A | * | 8/1989 |
| WO | 2019040509 | | 2/2019 |

OTHER PUBLICATIONS

CN 113798341 machine translation (Year: 2021).*
Sears. Titanium spray formed structures. Advances in Powder Metallurgy & Particulate Materials (1992) vol. 1, Powder Production and Spray forming, 281-90. (Year: 1992).*
Froes, ed. Melting, Casting, and Powder Metallurgy. Titanium-Physical Metallurgy, Processing, and Applications. 2015 ASM International. pp. 162-205. (Year: 2015).*
Zhang et al. Fabrication of low-cost Ti-1Al-8V-5Feby powder metallurgy with TiH2 and FeV80 alloy. Materials and Manufacturing Processes. 2017, vol. 32, No. 16, 1869-1873. (Year: 2017).*
CN 101462225 machine translation (Year: 2009).*
CN 102002615 machine translation (Year: 2011).*
JP H01-205060 machine translation (Year: 1989).*
Palanivel et al. Friction Stir Additive Manufacturing: Route to High Structural Performance. JOM, vol. 67, No. 3, 2015, 616-621. (Year: 2015).*
Agrawal et al. Processing-structure-property correlation in additive friction stir deposited Ti-6Al-4V alloy from recycled metal chips. Additive Manufacturing 47 (2021) 102259. (Year: 2021).*
European Patent Office, European Search Report dated Jul. 11, 2023 in Application No. 23160001.6.

* cited by examiner

SYSTEMS AND METHODS FOR MANUFACTURING LANDING GEAR COMPONENTS USING TITANIUM

FIELD

The disclosure generally relates to the manufacture of aerospace components using titanium and other metallic powders and, more particularly, to additive manufacture of landing gear components.

BACKGROUND

Aircraft landing gear designs incorporate large structural components made from high strength titanium alloys. Powder based additive manufacturing techniques, such as powder bed, for titanium alloy landing gear components are unsuited for producing large parts. Additive manufacturing techniques may be used to form large parts. However, existing feedstocks for titanium alloys tend to be high cost and tend to have reduced tensile and/or fatigue strength in comparison to wrought processed material.

SUMMARY

In various embodiments, a metallic part comprises a functionally graded monolithic structure characterized by a variation between a first material composition of a tubular preform and a second material composition of a secondary structural element, wherein each of the first material composition and the second material composition comprises at least one of a titanium metal or an alloy of titanium.

In various embodiments, the first material composition comprises an alpha-beta titanium alloy or a beta titanium alloy. In various embodiments, the second material composition comprises a beta titanium alloy. In various embodiments, the secondary structural element is one of a rectilinear lug portion, a cylindrical lug portion, a rounded rectangular lug portion, a chamfered rectangular lug portion, or a lobed portion. In various embodiments, the tubular preform comprises between 4% and 6% by weight iron, between 0.5% to 2% by weight aluminum, and between 6% to 9% by weight vanadium. In various embodiments, the secondary structural element comprises between 0.25% and 0.50% by weight oxygen and between 0.001% and 0.015% by weight hydrogen. In various embodiments, the tubular preform between 5.5% and 6.75% by weight aluminum and between 3.5% to 4.5% by weight vanadium. In various embodiments, the tubular preform may comprise a beta titanium alloy, a Ti-6Al-4V alloy, or a Ti-1Al-8V-5Fe alloy.

In various embodiments, a method of manufacturing a landing gear component comprises mixing a plurality of powdered metals comprising titanium, iron, vanadium, and aluminum to produce a powder blend, cold isostatic pressing the powder blend, sintering the cold pressed powder blend to form a billet, performing a spraycasting operation with the billet to produce a rough tubular preform, performing thermomechanical processing operations on the rough tubular preform to generate a near net shape tubular preform, performing material removal operations on the near net shape tubular preform including removal of a mandrel to generate a tubular preform, loading the tubular preform into an additive manufacturing machine, forming a secondary structural element integral to the tubular preform to form a part, and heat treating the part to generate a functionally graded monolithic structure. In various embodiments, wherein the titanium is a titanium hydride powder and the tubular preform comprises a less than 2.5 wt. % iron. In various embodiments, the powder blend comprises between 4% and 6% by weight iron, between 0.5% to 2% by weight aluminum, and between 6% to 9% by weight vanadium. In various embodiments, the sintering is performed between 900° F. and 1600° F. and under a vacuum. In various embodiments, the thermomechanical processing operations include solutionizing heat treatment, aging, or annealing. In various embodiments, in response to the sintering, the powder blend undergoes dehydrogenation and a $TiH_2 \rightarrow Ti + 2H$ reaction and generates defects in a titanium crystal lattice. In various embodiments, in response to the sintering, hydrogen emitted from the titanium crystal lattice reduces surface oxides via a $TiO_2 + 2H \rightarrow Ti + H_2O$ reaction.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Titanium alloy Ti-185 has a relatively high tensile strength; however, the high iron percentage of the alloy causes segregation during conventional melting. Stated another way, titanium alloys having iron compositions above 3% by weight tend to have an iron composition prone to segregation by conventional manufacture via melting. Powder metallurgy techniques such as, for example, pressing and sintering may overcome the segregation issues induced in conventional melt metallurgy, thereby enabling a lower cost part. Alloying powder may be either elemental powders (e.g., Ti, Fe, V, Al), master alloy powders, or a combination thereof. In this regard, large, high strength titanium alloy components such as, for example, pistons, bogie beams, torque links, brake rods, and/or the like may be produced at reduced cost. Additionally, additive manufacturing according to the process described herein may tend to overcome macro segregation issues encountered in conventional melt metallurgy and benefit of enhanced fatigue and ultimate strength.

Figure 1A:
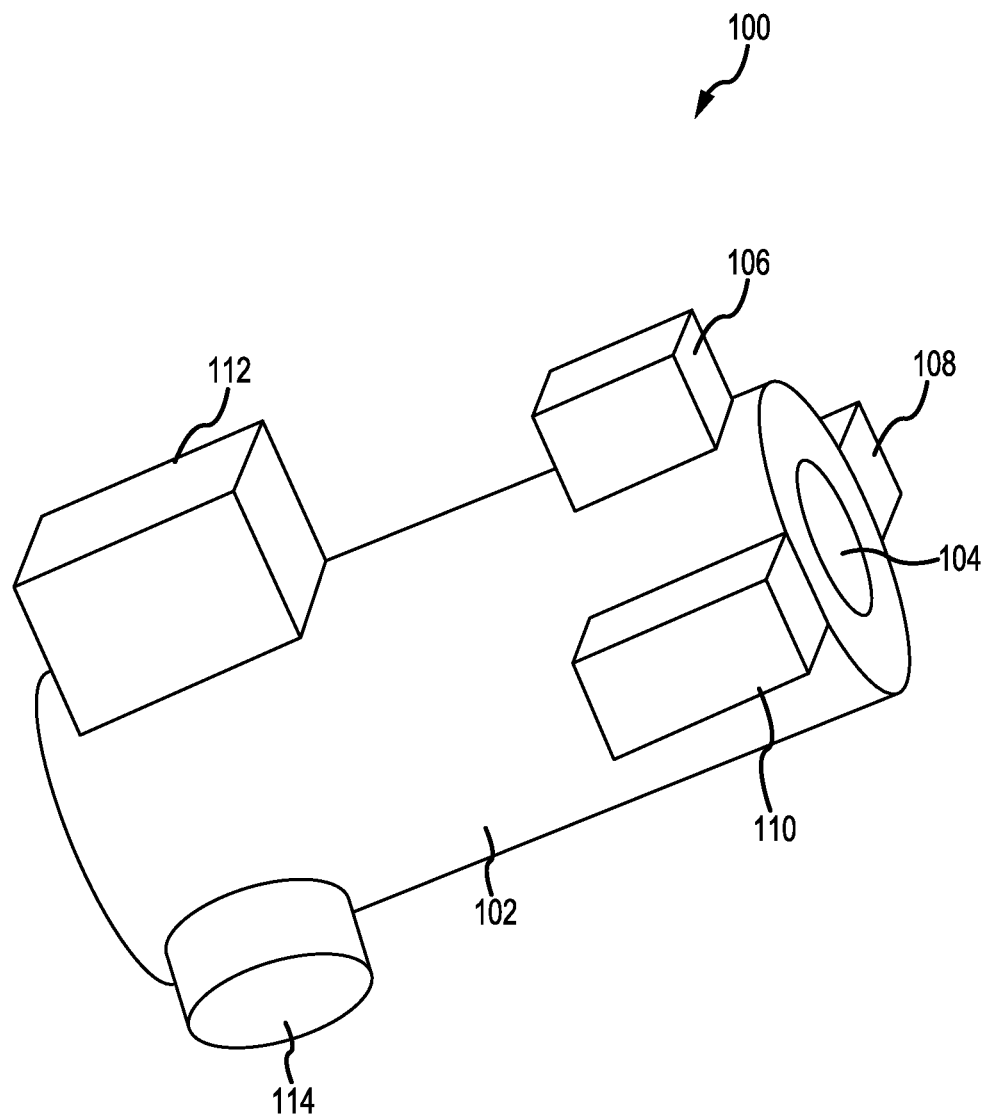
FIG. 1A illustrates an additively manufactured part, in accordance with various embodiments.
Figure 1B:
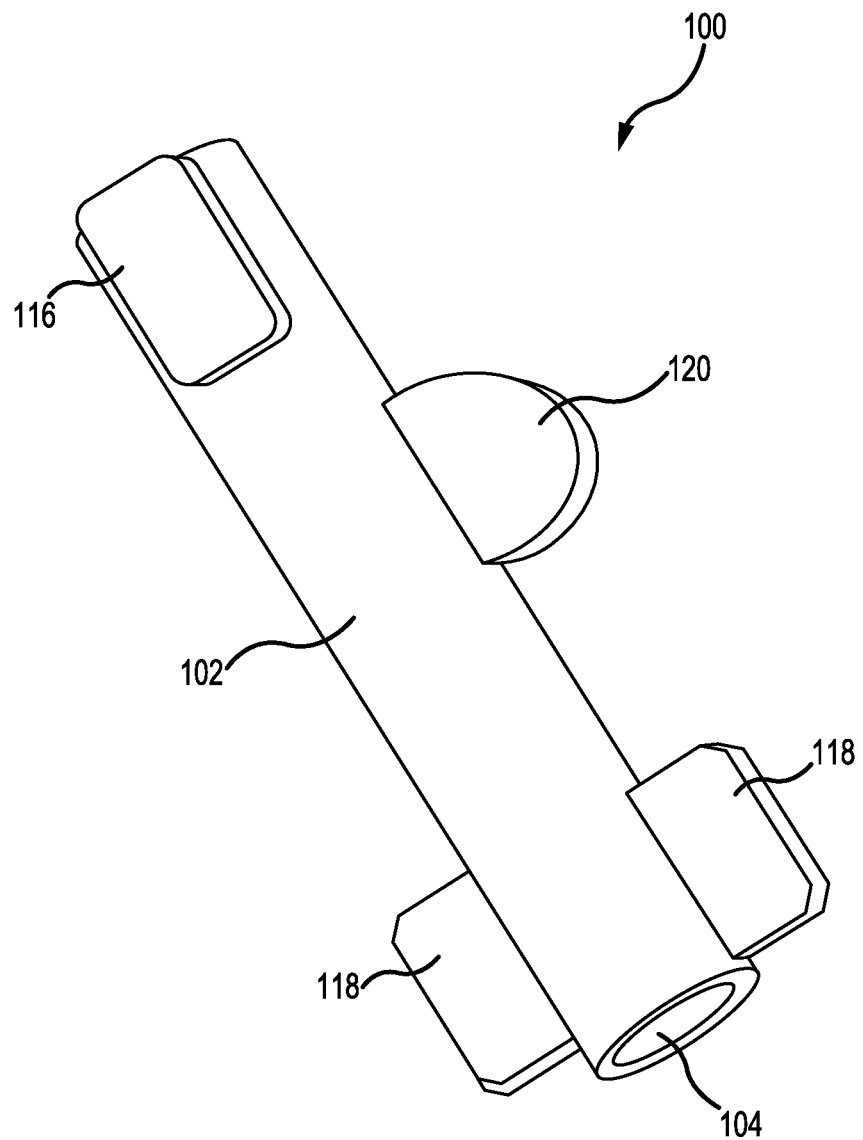
FIG. 1B illustrates an additively manufactured part, in accordance with various embodiments.

With reference to FIGS. 1A and 1B, an additively manufactured part 100 is shown in perspective views in accordance with various embodiments. Part 100 may comprise a functionally graded structure characterized by a variation in structural material composition between structural elements of a monolithic structure. In this regard, the monolithic structure may be tailored to the particular engineering design loads for each structural element as a function of the material composition of the structural element (i.e. functionally graded). Part 100 may comprise a tubular preform 102 defining a bore 104 extending axially therethrough. Tubular preform 102 comprises a first metallic material such as one of a metal, an alloy, a titanium alloy, and/or the like. In various embodiments, tubular preform 102 defines the first structural element of part 100 and comprises an iron free titanium alloy, or substantially less iron free titanium alloy of up to 2.5 wt. % iron, or an alpha-beta titanium alloy such as, for example, Ti-64 alloy (Ti-6Al-4V) conforming to SAE AMS 4911 comprising aluminum at 5.5-6.75 wt. %, vanadium at 3.5-4.5 wt. %, yttrium at not more than 0.005 wt. %, iron at not more than 0.3 wt. %, carbon at not more than 0.08 wt. %, nitrogen at not more than 0.05 wt. %, hydrogen at not more than 0.015 wt. %, a total of other elements at not more than 0.4 wt. %, and with the balance of titanium. In various embodiments, tubular preform 102 may be of any alpha-beta alloy known to those skilled in the art where low material cost tends to be preferred over material strength.

In various embodiments, one or more secondary structural elements such as first 106, second 108, third 110, and fourth 112 rectilinear lug portions may be formed on the tubular preform 102. In various embodiments, the secondary structural elements may include a cylindrical lug portion 114. The axis of the cylindrical lug portion 114 may be parallel to the radius of the tubular preform 102. As shown in FIG. 1B, the secondary structural elements may include a rounded rectangular lug portion 116, a chamfered rectangular lug portion 118, or a lobed portion 120. In various embodiments, the lobed portion may be cylindrical and have an axis orthogonal to the radius of the tubular preform 102.

Each of the secondary structural elements may comprise a second metallic material such as one of a metal, an alloy, a titanium alloy, and/or the like. In various embodiments, the structural elements (106, 108, 110, 112, 114, 116, 118, 120) comprise a titanium-iron alloy or a beta titanium alloy such as, for example, Ti-185 alloy (Ti-1Al-8V-5Fe) comprising aluminum at 0.8-1.5 wt. %, vanadium at 7.5-8.5 wt. %, iron at 4-6 wt. %, oxygen at 0.25-0.5 wt. %, nitrogen at not more than 0.070 wt. %, carbon at not more than 0.050 wt. %, and with the balance of titanium. Each of the secondary structural elements (106, 108, 110, 112, 114, 116, 118, 120), may be formed integrally with the first structural element (i.e. tubular preform 102) via an additive manufacturing process. The additive manufacturing process may include one of friction stir additive manufacturing (FSAM), selective laser melting, selective metal sintering, direct energy deposition, wire deposition, wire arc, and/or any suitable additive manufacturing process known to those in the art.

Figure 2A:
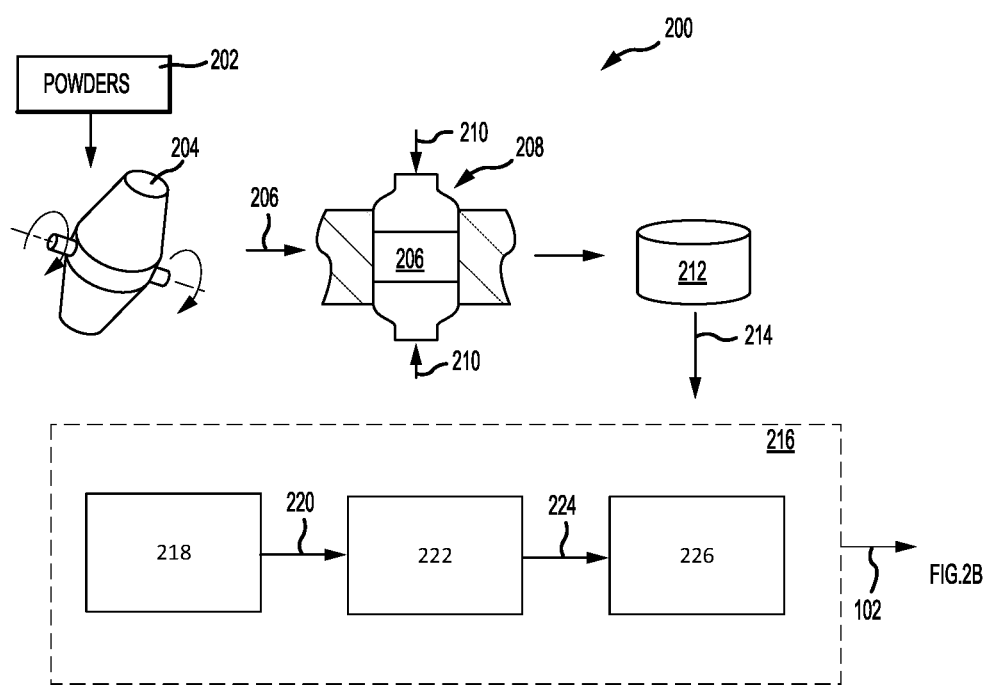
FIG. 2A illustrates a method for manufacturing a landing gear component, in accordance with various embodiments.

With additional reference to FIG. 2A, a method for landing gear component manufacturing is illustrated according to various embodiments. A plurality of powdered metals 202 comprising titanium hydride ($TiH_2$), iron (Fe), and Vanadium-Aluminum (V—Al) are added to powder blender 204 and blended to consistency to powder blend 206. In various embodiments, the powders may be produced by hydrogenation of a titanium sponge to produce a hydrogenated titanium sponge. The titanium sponge may then be crushed and/or ball milled and screened to a desired size. The use of $TiH_2$ power may tend to result in an improved balance of mechanical properties, lower residual porosity, lesser contamination, and a finer microstructure in comparison to the use of a pure titanium metal powder. As discussed below, activated sintering may tend to enable phase transformations accompanied by dehydrogenation and reactions of surface-located impurities with atomic hydrogen. As discussed below, during vacuum sintering, dehydrogenation of the material with a $TiH_2 \rightarrow Ti+2H$ reaction takes place thereby creating defects in the titanium crystal lattice. Such defects are desirable for promoting accelerated diffusion which thereby improvise sintering and homogenization of the powder blend. Furthermore, highly active atomic hydrogen emitted from the titanium crystal lattice may tend to reduce surface oxides via a $TiO_2+2H \rightarrow Ti+H_2O$ reaction. The active atomic hydrogen may also tend to react with C and Cl impurities thereby cleaning the material and reducing impurity (O, Cl, C) content in the sintered product. In various embodiments, hydrogen may be removed from the material after providing its beneficial effects during sintering and alloy formation. Thus, the mechanical properties of the produced alloy are not negatively affected by the presence of hydrogen.

In various embodiments, powder blend 206 may comprise titanium and iron and any of oxygen, aluminum, vanadium, and/or hydrogen. Powdered metals 202 may include titanium hydride powder. Powder blend 206 may be between 4% and 6% by weight iron, between 0.5% to 2% by weight aluminum, and between 6% to 9% by weight vanadium. The input powders may contain oxygen levels between 0.25% and 0.5% by weight and hydrogen levels up to 0.015% by weight or between 0.001% and 0.015% by weight. In various embodiments, powdered metals consist of Al—V master alloy and Fe elemental powder blended with $TiH_2$ powder. The powders may be ball milled and sieved to achieve a desired size distribution. The billet elemental weight percent may be adjusted to account for vaporization of elements such as aluminum during additive manufacturing process tending thereby to ensure the additive manufactured part is within a desired weight percent limit. In various embodiments, the billet shape may be a solid round or other shape as appropriate for forming operations.

Powder blend 206 is loaded into sintering furnace 208 which applies force 210 to compact the powder blend 206 and heat to sinter the powder blend 206, thereby forming billet 212. In various embodiments, the powder blend 206 may be compressed by cold isostatic pressing to form a compressed shape prior to sintering. In various embodiments, sintering furnace 208 may be an activated sintering furnace and/or a vacuum sintering furnace and powder blend 206 may be compressed and heated under a vacuum. In various embodiments, the compressed powder blend 206 may be heated to between 900° F. [483° C.] and 1600° F. [871° C.] or between 950° F. [510° C.] and 1600° F. [871° C.] or between 1100° F. [593° C.] and 1600° F. [871° C.] or between 1300° F. [704° C.] and 1600° F. [871° C.] for the sintering operation. In this regard, the sintered billet may undergo beta phase transformation. Sintering the powder blend 206 may include removing gasses evolved from the powder blend 206 during sintering and sintering furnace 208 may include a gas removal system and/or gas addition system and associated control systems. In various embodiments, oxygen, nitrogen, and/or hydrogen may be removed from the powder blend 206 during sintering. In various embodiments, neutral gasses such as argon may be added to the powder blend 206 during sintering. In various embodiments, the neutral gasses added may have a partial pressure of $10^{-2}$ Torr. In various embodiments, billet 212 may undergo an annealing cycle subsequent to sintering and prior to forming operations 216. In various embodiments, the annealing cycle temperatures may be between 1200° F. [649° C.] and 1400° F. [760° C.] or between 1250° F. [677° C.] and 1400° F. [760° C.] or between 1300° F. [704° C.] and 1400° F. [760° C.].

Billet 212 may receive an initial anti-oxidation coating 214 prior to undergoing forming operations 216. In various embodiments, any of the forming operations 216 may be conducted in a vacuum or under an inert gas such as, for example, argon. In various embodiments, forming operations 216 may process the sintered billet 212 via spray casting operations 218. Spray casting operations 218 may include melting the sintered billet 212 and spraycasting over a cylindrical mandrel to produce a rough tubular preform 220. In various embodiments, the spraycasting may be performed at temperatures in excess of the liquidus point of the alloy. The deposition thickness may be varied between 0.07 in [2 mm] to greater than 20 in [508 mm].

The rough tubular preform 220 may be further processed via thermomechanical processing operations 222. In various embodiments, operations 222 may include hot radial forging, rolling, open and/or closed die forging, and/or hot extrusion to produce a near net shape tubular preform 224. The rough tubular preform 220 may undergo one or more heat treatment operations as part of processing operations 222, for example, in a heat treat oven between forming operations 216 (e.g., intermediate heat treatments) and/or when the rough tubular preform 220 has achieved the desired final diameter (e.g., final heat treatment) In this regard, crack formation and oxide formation during forming operations 216 may be reduced. Heat treatment operations may include solutionizing heat treatment, aging, and/or annealing. In various embodiments, heat treatments may include a beta anneal and an alpha beta anneal. For example, annealing between 1550° F. [843° C.] and 1600° F. [871° C.] or annealing between 1200° F. [649° C.] and 1400° F. [760° C.] or annealing between 1300° F. [705° C.] and 1350° F. [732° C.]. In various embodiments, a solutionizing heat treatment may be between 1350° F. [732° C.] and 1450° F. [788° C.] or between 1375° F. [746° C.] and 1450° F. [788° C.] or between 1400° F. [760° C.] and 1450° F. [788° C.] or between 1425° F. [774° C.] and 1450° F. [788° C.] or between 1650° F. [899° C.] and 1775° F. [968° C.]. In various embodiments, an aging heat treatment may be between 800° F. [427° C.] and 1100° F. [593° C.] or between 900° F. [482° C.] and 1100° F. [593° C.] or between 1000° F. [538° C.] and 1100° F. [593° C.] or between 900° F. [482° C.] and 1275° F. [691° C.] or may be adjusted to achieve a desired material property for component manufacture. In various embodiments, the near net shape tubular preform 224 may have between 0.001% and 0.015% by weight hydrogen and may have between 0.25% and 0.5% by weight oxygen.

In various embodiments, the near net shape tubular preform 224 may be further processed via material removal operations 226 to generate the tubular preform 102. Operations 226 may include removal of the tubular preform from the mandrel used during spray casting operations 218. In various embodiments, operations 226 may comprise machining, boring, or chemical milling to remove the mandrel.

Figure 2B:
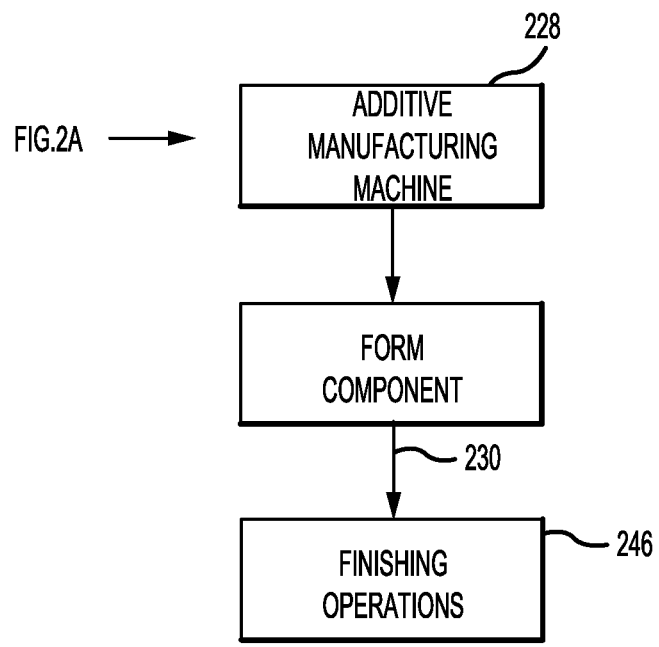
FIG. 2B illustrates a continuation of a method from FIG. 2A for manufacturing a landing gear component, in accordance with various embodiments.

In various embodiments and with additional reference to FIG. 2B, the tubular preform 102 may be loaded in an additive manufacturing machine 242 configured to perform additive manufacturing processes on the tubular preform 102. Additive manufacturing machine 228 may comprise hardware and/or software configured to perform additive manufacturing of an aerospace component. In various embodiments, additive manufacturing may include FASM, laser wire metal deposition, electron beam additive manufacturing, wire arc additive manufacturing and/or the like. In various embodiments, additive manufacturing machine 228 may be configured to deposit the secondary structural elements on the preform 102. Additive manufacturing machine 228 may produce a metallic aerospace component 230 from the tubular preform 102. Metallic aerospace component 230 may undergo finishing operations 246 such as, for example, thermomechanical treatment and final machining. In various embodiments, finishing operations 246 include operations similar to thermomechanical processing operations 222.

Figure 3:
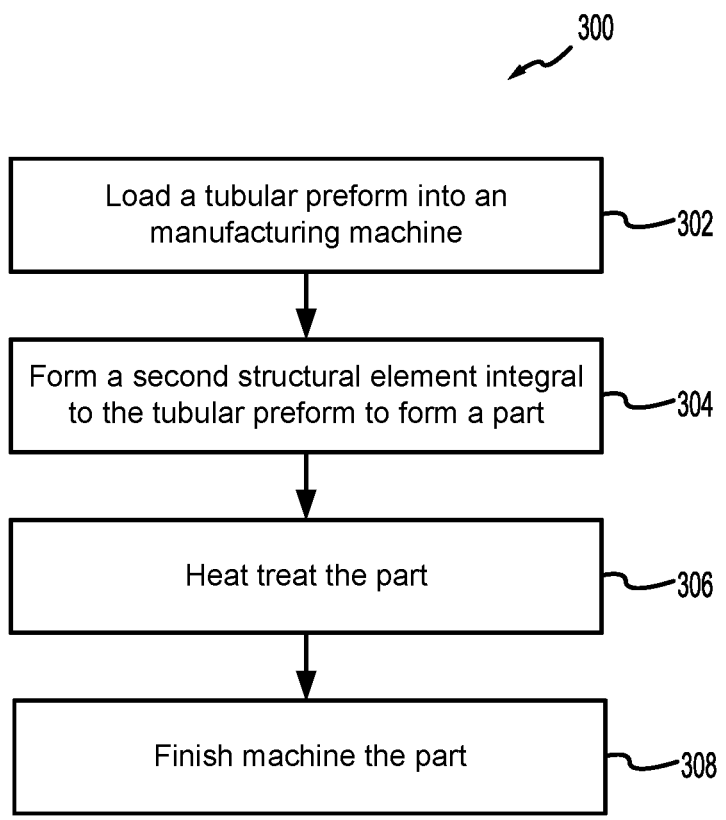
FIG. 3 illustrates a method of additive manufacturing, in accordance with various embodiments.

In various embodiments and with additional reference to FIG. 3, a method 300 of manufacturing a functionally graded metallic part is illustrated. Method 300 may include loading a first structural element into an additive manufacturing machine (step 302). For example, tubular preform 102 may be loaded in to additive manufacturing machine 228. Method 300 includes forming a secondary structural element integral to the first structural element to form a part (step 304). For example, material may be continuously deposited over tubular preform 102 to form any of the secondary structural elements (106, 108, 110, 112, 114, 116, 118, 120), of part 100. Method 300 may include heat treating the part (step 306) for example by one of annealing, solutionizing, or aging to generate a functionally graded monolithic structure. As will be appreciated by those skilled in the art, the functionally graded monolithic structure may benefit of as formed part heat treating and heat treating variables may be tailored in consideration of the first material composition and the second material composition. The heat treating temperature may tend to drive similar microstructural transformations, such as, for example overlapping the annealing temperatures. In one embodiment, for example incorporating a Ti-6Al-4V tubular preform and additive manufactured Ti-185 features having annealing temperatures of 1300° F. [705° C.] to 1650° F. [899° C.] and 1250° F. [677° C.] to 1350° F. [732° C.], respectively, the as formed structure may be annealed between 1300° F. [705° C.] and 1350° F. [732° C.]. Alternatively, the heat treating temperature may drive different microstructural transformations. In another embodiment, an alpha-beta annealing temperature of Ti-6Al-4V may serve as a beta annealing temperature for Ti-185, as the beta transus temperature for Ti-185 (1525° F. [830° C.]) is markedly different than for Ti-6Al-4V (1825°

F. [996° C.]). Such a heat treatment may result in a functionally graded part having differing microstructures tailored for a desired structural performance of a part feature such as, for example, a Widmenstattan or lamella structure for one titanium alloy (e.g., the first material composition), and a mill annealed microstructure for the other (e.g., the second material composition). Method 300 may include finish machining the part (step 308) such as, for example, by a subtractive manufacturing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a landing gear component, comprising:

mixing a plurality of powdered metals comprising titanium, iron, vanadium, and aluminum to produce a powder blend;

cold isostatic pressing the powder blend;

sintering the cold pressed powder blend to form a billet;

performing a spraycasting operation with the billet to produce a rough tubular preform, wherein the spraycasting operation includes melting the sintered billet to form a molten metal and spraycasting the molten metal over a cylindrical mandrel to produce the rough tubular preform;

performing thermomechanical processing operations on the rough tubular preform to generate a near net shape tubular preform, wherein the thermomechanical processing operations comprise hot radial forging and wherein the thermomechanical processing operations further include at least one of solutionizing heat treatment or aging;

performing material removal operations on the near net shape tubular preform including removal of a mandrel to generate a tubular preform;

loading the tubular preform into an additive manufacturing machine;

forming, via friction stirred additive manufacturing, a secondary structural element integral with the tubular preform to form a part, wherein the secondary structural element is at least one of a rounded rectangular lug portion, a chamfered rectangular lug portion, or a lobed portion;

heat treating the part to generate a functionally graded monolithic structure; and machining the part to form the landing gear component.

2. The method of claim 1, wherein the titanium is a titanium hydride powder and the tubular preform comprises less than 2.5 wt. % iron.

3. The method of claim 1, wherein the powder blend comprises between 4% and 6% by weight iron, between 0.5% to 2% by weight aluminum, and between 6% to 9% by weight vanadium.

4. The method of claim 3, wherein the sintering is performed between 900° F. and 1600° F. and under a vacuum.

5. The method of claim 1 wherein the titanium is a titanium hydride powder and wherein in response to the sintering, the powder blend undergoes dehydrogenation and a $TiH_2 \rightarrow Ti+2H$ reaction and generates defects in a titanium crystal lattice.

6. The method of claim 5, wherein in response to the sintering, hydrogen emitted from the titanium crystal lattice reduces surface oxides via a $TiO_2+2H \rightarrow Ti+H_2O$ reaction.

7. The method of claim 1, wherein the functionally graded monolithic structure includes a variation between a first material composition of a tubular preform and a second material composition of a secondary structural element, wherein each of the first material composition and the second material composition comprises at least one of a titanium metal or an alloy of titanium.

8. The method of claim 7, wherein the first material composition comprises an alpha-beta titanium alloy or a beta titanium alloy.

9. The method of claim 8, wherein the second material composition comprises a beta titanium alloy.

10. The method of claim 7, wherein the secondary structural element is a set of secondary structural elements and wherein the set of secondary structural elements are at least one of a rectilinear lug portion, a cylindrical lug portion, and at least one of the rounded rectangular lug portion, the chamfered rectangular lug portion, or the lobed portion.

11. The method of claim 10, wherein the tubular preform comprises between 4% and 6% by weight iron, between 0.5% to 2% by weight aluminum, and between 6% to 9% by weight vanadium.

12. The method of claim 11, wherein the secondary structural element comprises between 0.25% and 0.50% by weight oxygen and between 0.001% and 0.015% by weight hydrogen.

13. The method of claim 10, wherein the tubular preform comprises between 5.5% and 6.75% by weight aluminum and between 3.5% to 4.5% by weight vanadium.

* * * * *